United States Patent [19]

Hashimoto et al.

[11] Patent Number: 4,500,211
[45] Date of Patent: Feb. 19, 1985

[54] AUDIBLY ANNOUNCING APPARATUS WITH POWER SAVING FEATURE

[75] Inventors: Shintaro Hashimoto, Ikoma; Sigeaki Masuzawa, Nara; Shinya Shibata, Yamatokoriyama; Hiroshi Tsuda, Uji; Masahiro Nakano, Yamatokoriyama, all of Japan

[73] Assignee: Sharp Kabushiki Kaisha, Osaka, Japan

[21] Appl. No.: 373,680

[22] Filed: Apr. 30, 1982

Related U.S. Application Data

[63] Continuation of Ser. No. 129,653, Mar. 12, 1980, abandoned.

[30] Foreign Application Priority Data

Mar. 12, 1979 [JP] Japan .................. 54-29024

[51] Int. Cl.³ .................. G04B 21/08; G04B 1/00
[52] U.S. Cl. .................. 368/63; 368/204
[58] Field of Search .................. 368/72-75, 368/63, 204, 250, 251; 179/1 SA, 1 SM

[56] References Cited

U.S. PATENT DOCUMENTS

| | | | |
|---|---|---|---|
| 3,998,045 | 12/1976 | Lester | 368/63 |
| 4,055,843 | 10/1977 | Whitaker | 368/273 |
| 4,137,428 | 1/1979 | Federico | 179/1 SW |
| 4,158,285 | 6/1979 | Heinsen et al. | 368/10 |
| 4,208,866 | 6/1980 | Ebihara | 368/251 |
| 4,282,404 | 8/1981 | Tanimoto et al. | 179/1 SM |
| 4,287,584 | 9/1981 | Tanimoto et al. | 368/63 |

*Primary Examiner*—Vit W. Miska
*Attorney, Agent, or Firm*—Birch, Stewart, Kolasch & Birch

[57] ABSTRACT

An audibly announcing apparatus capable of announcing updated time or results of arithmetic operations in the form of audible sounds or synthesized voices, for example, a talking clock and a talking calculator is provided with power saving circuitry. A detector is provided for detecting the operating state of the apparatus where audible sounds or synthesized voices are to be outputted. The power saving circuitry prevents power from being supplied to a voice generator consumes most of power dissipated by the apparatus, when it is not desired to output audible voices. The voice generator includes a central processing unit (CPU), a program read only memory (P-ROM) and a digital-to-analog converter.

9 Claims, 2 Drawing Figures

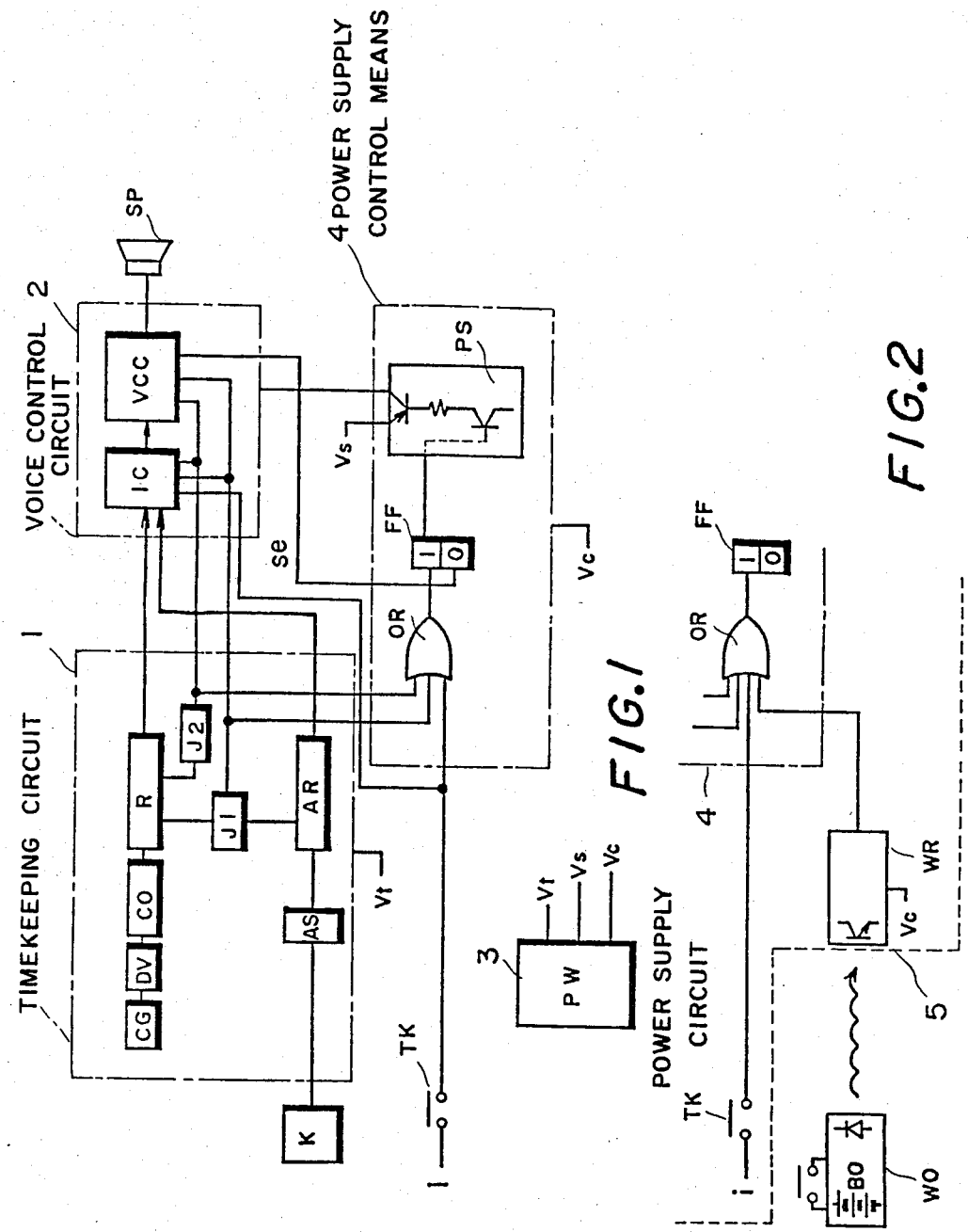

AUDIBLY ANNOUNCING APPARATUS WITH POWER SAVING FEATURE

This application is a continuation of copending application Ser. No. 129,653, filed on Mar. 12, 1980, now abandoned.

BACKGROUND OF THE INVENTION

This invention relates to an audibly announcing apparatus, and more particularly to power supply control circuitry with power saving features for use in an audibly announcing apparatus.

Recently, new types of devices which provide information in the form of audible sounds or synthesized voices have been developed; for example, a talking watch that provides audible sounds indicative of updated time and a talking calculator that performs arithemetic operations on keyed information and provides the results of the arithmetic operations in the form of audible sounds or voices. The use of a recording medium such as a magnetic tape storing a given number of phenomes in the form of analog signals and a speech synthesis method which relies upon a semiconductor memory or like for storing digitally encoded phoneme data and a digital-to-analog converter are widely known ways of converting numerical information and time information.

However, the circuitry which ultimately converts such numerical information or time information (hereinafter referred to as "voice control circuit") tends to consume a relatively great amount of power as compared with the internal circuitry of the audibly announcing apparatus including a timekeeping circuit and a calculation circuit. This is due to the fact that the recording medium control needs some mechanical controls and the speech synthesis method must process arithmetic operations at high speed. It is universally appreciated that the higher the processing speed the greater power consumption.

OBJECTS AND SUMMARY OF THE INVENTION

Accordingly, it is an object of the present invention to provide a power saving circuit which supplies power to a voice control circuitry or a voice generator only when it is desired to announce audibly some information and otherwise prevents the supply of power to the voice control circuitry, thus reducing power dissipation within an overall arrangement to a minimum. More particularly, with the advent of reliable large scale integrated circuits (LSI) chips and speech synthesis methods using solid state memories the present invention is very useful to battery-powered and miniaturized apparatus.

In carrying out the aforesaid objects and other objects and advantages in accordance with the present invention, an audibly announcing apparatus having means for announcing information in the form of audible sounds or voices is characterized by the provision of means for sensing the state of said apparatus where audible sounds or voices are to be outputted and for controlling power supply to said information announcing means.

BRIEF DESCRIPTION OF THE DRAWINGS

The foregoing as well as other objects, features and advantages of the present invention will become more readily appreciated upon the consideration of the following detailed description of the illustrated embodiments, together with the accompanying drawings, wherein:

FIG. 1 is a schematic block diagram of one preferred embodiment of the present invention; and FIG. 2 is a schematic block diagram of another preferred embodiment of the present invention.

DETAILED DESCRIPTION OF THE ILLUSTRATED EMBODIMENT

Referring initially to FIG. 1, a talking timepiece embodying the present invention is illustrated in a schematic block diagram, which generally comprises a timekeeping circuit 1, a voice control circuit 2, a power supply circuit 3 and a power supply control circuit 4. The power supply circuit 3 supplies respectively voltages $V_t$, $V_s$ and $V_c$ to the timekeeping circuit, the voice control circuit and the power supply control circuit, the two $V_t$ and $V_c$ of which are coupled directly to the respective utilization circuits and the last $V_s$ of which is coupled to the voice control circuit 2 via the voltage supply control circuit 4. The illustrated embodiment is so constructed as to announce instantaneous time in the form of audible voices upon actuation of a touch key TK as a time recall key, provide alarming information in the form of an audible speech upon arrival of preset time and announce clock information at a given interval of time (say, one hour).

Within the timekeeping circuit 1 of a well-known construction, an oscillator CG develops as a time standard proper frequency signals which in turn are divided into a 1 Hz signal (that is, a 1 second signal), for example, through the use of a divider DV. A counter CO counts this 1 Hz signal and updates current time information stored in a register P. Another register AR stores alarm time settings which are entered from a keyboard K having digit keys and time unit selection keys via an input control circuit AS. A decision circuit $J_1$ decides if there is equality between the current time register R and the alarm time register AR, whereas a second decision circuit $J_2$ senses sharp time such as 12:00 pm and 3:00 am.

The voice control circuit 2 consists of an input control circuit IC and an audible output control circuit VCC. Although not shown in detail, the audible output control circuit VCC includes a central processing unit (CPU), a program read only memory (P-ROM), a digital-to-analog converter, an audio amplifier and so forth. Audio signals from the output control circuit VCC are fed into a loud speaker SP for the purpose of audible announcement.

A flip-flop FF in the power supply control circuit 4 receives at its set terminal the output from the touch switch TK and the outputs of the respective decision circuits $J_1$ and $J_2$ all applied via a logic OR gate OR and is placed into its reset state upon receipt of any of those outputs. With the flip-flop FF in the set state, a power switch circuit PS becomes operative to feed the power supply voltage $V_s$ to the voice control circuit 2.

When the output signal is developed via the touch key TK, the voice control circuit 2 is enabled with the power supply voltage $V_s$ so that the current or updated time is transferred from the current time register R into the voice output control circuit VCC to deliver an audible message "it is now five fourty", for example, via the loudspeaker SP according to the contents of the current time information. If the decision circuit $J_1$ develops an equality signal, then the alarm time information is unloaded from the alarm time register AR and the equality signal applied to the voice output control circuit VCC triggers the delivery of an alarm message such as "peep, peep, it is now 7:55 am." On the other hand, when the decision circuit $J_2$ provides the equality signal, the current time information is unloaded from the register R and properly processed under control of the equality signal in such a manner as to deliver a message "please attention, it is now 3:30 pm, peep, peep, peep," for example.

Upon the completion of the those audible message the voice output control circuit VCC develops an audible message end signal Se and resets the flip-flop FF. At the same time the power switch circuit Ps discontinues the power supplied to the voice control circuit 2.

In the embodiment of FIG. 1, the most part of the timekeeping circuit 1 and the voltage control circuit 4 except for the power switch circuit PS, for example, may be implemented with a CMOS circuit. The results of the inventors' experiments indicate that a sum of power dissipation therein reached no more than 90 $\mu W$, while the voice control circuit 2 including the CPU, P-ROM, D/A converter, audio amplifier and the like as described above as a whole consumed several mW of power due to the need for high speed speech synthesis procedures. As discussed with respect to the illustrated embodiment, provided that the supply voltage Vs is fed into the voice control circuit 2 only when it is necessary to provide any audible message, a total of power dissipation may be reduced to a minimum.

FIG. 2 is a schematic block diagram illustrating another embodiment of the present invention which is adapted to recall time by a wireless remote control scheme. A transmitter WO is separate from a timepiece body 5 and a receiver WR is built within the timepiece body 5.

The transmitter WO has a power source BO such as a conventional battery and needs no power except when in the transmission mode. Although the receiver WR may use the above-mentioned voltages Vc, Vt and Vs, it has only to receive an infrared signal sent from the transmitter and needs no substantial amount of power itself. In this case it becomes possible to save power when the power supply to the voice control circuit is turned on immediately before the delivery of any audible voice or message.

Whereas the above embodiments have been shown and discussed with respect to a talking timepiece designed to announce information such as updated time in the speech synthesis method using a semiconductor memory, the type of information and means for generating audible signals should not be limited thereto in reducing power consumption within various apparatus which announce some information in the form of audible sounds or voices. An appropriate timer which covers a specific range of time may replace the flip-flop FF within the power supply control circuit 4.

We claim:

1. An audibly announcing timepiece comprising:
   timekeeping means for producing a signal indicative of the time of day;
   alarm means monitoring said signal produced by said timekeeping means for producing an alarm enable signal representative of the occurrence of a desired time of day;
   speech synthesis means responsive to the presence of said alarm enable signal produced by said alarm means and responsive to said signal indicative of the time of day for generating a representation of information stored therein in an audible synthetic speech voice;
   a power supply;
   enablement means for selectively supplying power from said power supply to said speech synthesis means when said alarm signal is present in order to enable said speech synthesis to produce said audible voice;
   said enablement means disconnecting power to said speech synthesis means when said audible sounds are not desired.

2. The timepiece of claim 1 wherein said enablement means further supplies power to said speech synthesis means when an indication of the actual time of day is desired;
   said signal indicative of the time of day being provided to said speech synthesis means for conversion into audible voices.

3. The timepiece of claim 2 wherein said power is supplied to said speech synthesis means only when necessary.

4. The timepiece of claim 3 wherein said enablement means includes a flip-flop set by application of said alarm enable signal;
   said flip-flop being reset when the generation of audible voices is completed;
   the output of said flip-flop enabling the supply of power from said power supply to said speech synthesis means.

5. The timepiece of claim 4 wherein an indication that annunciation of the actual time of day is desired is produced by actuation of a switch.

6. The timepiece of claim 5 wherein said switch is a wireless remote control switch.

7. An audibly announcing timepiece as set forth in claim 3, wherein said speech synthesis means includes a semiconductor memory for storing a given number of phonemes necessary for the production of audible sounds or voices.

8. A selectively enabled speech synthesis assembly comprising:
   means for intermittently generating information to be audibly announced;
   speech synthesis means responsive to said information produced by said means for generating for synthesizing an audible human speech representation of said information;
   power supply means for continuously supplying power to said means for generating and for independently supplying power to said speech synthesis means when required; and
   detection means responsive to said means for intermittently generating for sensing the presence of information to be audibly announced and for enabling the supply of power to said speech synthesis means by said power supply means only in response thereto.

9. The speech synthesis assembly of claim 8 wherein said detection means includes a flip-flop, said flip-flop being set by a first signal produced by said means for intermittently generating and indicative of the presence of information to be audibly announced to supply an enable signal to said power supply means to enable the supply of power to said speech synthesis means;
   said acoustic generator means producing an end signal indicative of the end of the audible annunciation of said information, said end signal being applied to the reset terminal of said flip-flop to terminate generation of said enable signal by said flip-flop and terminate the supply of power to said speech synthesis means.

* * * * *